Patented Aug. 18, 1953

2,649,439

UNITED STATES PATENT OFFICE 2,649,439

PREPARATION OF PLASTIC CONDENSABLE ALKYL ACRYLATE POLYMERS AND SUBSEQUENT ELASTO-CONDENSATION THEREOF

Harold P. Brown, Akron, Ohio, assignor to The B. F. Goodrich Company, New York, N. Y., a corporation of New York No Drawing. Application November 24, 1950, Serial No. 197,496

11 Claims. (Cl. 260—89.5)

The present invention relates generally to the preparation of plastic rubbery materials which are essentially linear polymers of an alkyl acrylate and are further characterized by the ability to undergo useful condensation reactions by reason of the presence in their structure of a controlled amount of free carboxyl (—COOH) groups, and to the subsequent elasticization (or curing) of such plastic alkyl acrylate polymers by a condensation reaction (termed herein "elasto-condensation") involving the free carboxyl groups.

In the copending related application of Earl J. Carlson, Serial No. 197,524, filed November 17, 1950, it has been disclosed that elastic rubbery condensation products having unusual and highly advantageous properties, are secured by first preparing a plastic workable alkyl acrylate polymer containing a controlled amount, from 0.01 to 0.30 chemical equivalent by weight for each 100 parts by weight of plastic polymer, that is from 0.45 to 13.5% by weight of the plastic polymer, of combined (or "polymer bound") carboxyl (—COOH) groups, and then condensing the carboxyl-containing, plastic polymer with a polyvalent metal oxide whereby elasticization of the plastic polymer occurs by reason of a salt-forming condensation-polymerization reaction involving the carboxyl groups of the polymer and the metallic cation of the polyvalent metal oxide, and resulting in a strongly elastic, polymeric metallo-carboxylate. The copending application particularly describes the preparation of the carboxyl-containing plastic alkyl acrylate polymer by copolymerization under acidic conditions of a monomeric mixture comprising predominately an alkyl ester of acrylic acid together with a minor proportion of an olefinically-unsaturated carboxylic acid.

This application is directed to another method of producing plastic, carboxyl-containing alkyl acrylate polymers admirably suited to subsequent elasto-condensation reactions. This method involves the treatment of a plastic alkyl acrylate polymer (the polymer itself being essentially free of carboxyl groups), with a hydrolyzing agent thereby to hydrolyze a portion of the hydrolyzable groups on the polymer molecules and produce a plastic polymer containing from 0.01 to 0.30 chemical equivalent by weight of combined carboxyl (—COOH) groups for each 100 parts by weight of polymer. The resulting hydrolyzed or carboxyl-containing polymer derived from a rubbery alkyl acrylate polymer is still plastic and rubbery in nature and is easily worked and, unlike the original polymer, undergoes elasto-condensation reactions with polyvalent metal oxides to produce strongly elastic, polymeric metallo-carboxylates of unusual tensile strength (even in the pure gum or unreinforced condition) and other unusual properties.

By this process it is possible for rubber and plastic processors having no polymerization equipment to convert plastic alkyl acrylate polymers, some of which are presently commercially available, such as polyethyl acrylate, polymethyl acrylate and copolymers of methyl and ethyl acrylate with vinyl chloride, vinylidene chloride, acrylonitrile and others, to plastic, carboxyl-containing polymers capable of undergoing elasto-condensation, and then subsequently to convert the carboxyl-containing polymers to strongly elastic, polymeric metallo-carboxylates.

The plastic polymeric materials utilizable in the hydrolysis step of the method of this invention are the plastic polymers of an alkyl acrylate which consist of predominantly linear polymer chains. The polymers may be the homopolymers such as polyethyl acrylate, copolymers of one or more than one alkyl acrylate, or plastic multi-component interpolymers of one or more than one alkyl acrylates with one or more than one other copolymerizable monomers, preferably monoolefinic monomers, such as chloroethyl vinyl ether, N,N-diethyl acrylamide, vinyl chloride, vinylidene chloride, vinyl acetate, acrylonitrile, styrene, isobutylene and the like. The copolymers and multi-component interpolymers should, in any case, be plastic and somewhat rubbery in nature and should therefore contain a major proportion of interpolymerized alkyl acrylate. While the ester groups in an alkyl acrylate polymer chain are readily hydrolyzable to carboxyl groups, it should be understood that the polymer may also contain other hydrolyzable groups such as that derived from an unsaturated amide (acrylamide or methacrylamide, for example), an unsaturated nitrile (acrylonitrile or methacrylonitrile, for example, or unsaturated acid chloride (acrylyl chloride, for example). In general, the copolymers and multi-component interpolymers which may be utilized, should contain from 50 to 98% of an alkyl acrylate and from 2 to 50% by weight, total, of one or more than one additional copolymerizable materials. Illustrative alkyl acrylates which are utilizable in the preparation of the plastic, hydrolyzable polymers include methyl acrylate, chloromethyl acrylate, ethyl acrylate, n-propyl acrylate, n-butyl acrylate, isobutyl acrylate, 3-hydroxybutyl acrylate, n-amyl acrylate, n-hexyl acrylate, n-heptyl acrylate, capryl acrylate (1-methylheptyl acrylate), n-octyl acrylate, 2-ethylhexyl acrylate, isooctyl acrylates such as (3-methylheptyl) acrylate), n-nonyl acrylate, isononyl acrylates such as 3,5,5-trimethylhexyl acrylate, n-decyl acrylate, lauryl acrylate and others.

It is preferred to utilize in the hydrolysis step a plastic polymer of any of the alkyl acrylates enumerated above in which the alkyl group contains from 1 to 12 carbon atoms. Better results, however, are obtained by the use of plastic polymers of any of the above-mentioned alkyl acrylates in which the alkyl group contains from 1 to 4 carbon atoms, the preferred polymer being one of ethyl acrylate.

The plastic polymers useful in the method of this invention may be produced in any manner adapted to the production of a plastic polymer. They may be produced by polymerization in aqueous emulsion in order to obtain a stable polymer dispersion or latex or they may be produced by polymerization in aqueous suspension in which case a fine granular polymer is obtained. They may also be prepared by polymerization in solution or in mass. The particular method of polymerization selected will depend to some degree upon the method of hydrolysis to be employed. That is, for example, emulsion polymerization is preferably employed when latex hydrolysis is to be employed while the aqueous suspension and mass polymerization methods might sometimes be preferred for the production of polymers to be hydrolyzed by mill mastication. The preferred method, however, is the aqueous emulsion polymerization method because it produces polymers of high molecular weight and sufficient plasticity as to yield, when hydrolyzed and heated with a metallic oxide, polymeric metallo-carboxylates of great elasticity and strength.

The hydrolysis step may be carried out in several ways differing considerably one from the other but all designed to produce a plastic, workable polymer containing a controllable quantity of combined carboxyl (—COOH) groups.

The hydrolysis reaction may be carried out in solution, in a solvent or mixture of solvents for the plastic alkyl acrylate polymer such as benzene, methyl ethyl ketone, acetone, a mixture of benzene and ethyl alcohol, and others by adding the hydrolysis reagent to the polymer solution and heating until the desired degree of hydrolysis is obtained. The hydrolysis may also be performed by the addition of an alkaline hydrolysis agent to an anionic latex or aqueous dispersion of the polymer or by the addition of an acidic hydrolysis agent to a cationic latex or aqueous dispersion of the polymer. Alternatively, the hydrolysis may be performed by masticating the solid polymer and hydrolysis agent on a rubber mill, in an internal mixer, Banbury etc., at elevated temperatures followed (if an alkaline hydrolysis reagent is utilized) by a wash-milling or malaxating in an internal mixer in the presence of water or aqueous acid solution. A still further procedure is to add the hydrolysis agent to the polymerization mixture during the preparation of the original acrylic polymer in a manner more fully described below.

The hydrolysis of the acrylic polymer is carried out in solution by first dissolving the polymer in a suitable solvent to make a dilute solution usually containing from 1 to 25% by weight polymer, preferably from 3 to 15%. To the dilute polymer solution in an autoclave is added a suitable hydrolysis agent, the autoclave then is closed and the mixture heated for the desired interval of time at temperatures of 30 to 250° C. If an alkaline hydrolysis agent is utilized the solution is then made acid (to a pH of about 1.0 to 1.5) by addition of suitable amounts of mineral or organic acid. The polymer is then precipitated from solution by the addition of about an equal volume of a suitable non-solvent such as an alcohol, hexane, and the like or by evaporation of the solvent.

When the hydrolysis reaction is carried out in a polymer latex or aqueous dispersion of polymer, the latex is first stabilized, if desired, by addition of suitable age resistors, polymerization terminators, etc. and also, if needed, by additional amounts of suitable emulsifiers, soaps, etc. The latex is then placed in an autoclave, the hydrolysis agent added, and the vessel and its contents heated to a temperature generally in the range of 30 to 250° C. for the desired length of time generally about 1 to 10 hrs. The latex usually is stable during such treatment so that coagulation of the latex is necessary. The coagulation is carried out under acidic conditions to obtain the solid hydrolyzed polymer. When an alkaline hydrolysis agent is utilized it is to be understood that the latex should be coagulated under acidic conditions and/or the coagulum extracted several times with dilute aqueous acid washes or malaxated in an internal mixture in the presence of water or aqueous acid solutions to produce a solid hydrolyzed polymer containing free carboxyl (—COOH) groups. The resultant solid polymer need only be dried in the conventional manner in order to obtain a plastic, easily worked carboxyl-containing polymer.

The latex hydrolysis reaction procedure is the most practical method for rubber processors having polymerization or chemical reaction equipment because it does not require the use and recovery of expensive volatile solvents. However, because the rubber in a latex is present as a discrete solid particle, the hydrolyzable groups in the interior of the particle tend to be attacked to a much lesser degree by the hydrolysis reagent than do those at the surface of the particle. For this reason, in order to secure a more uniform distribution of the carboxyl groups throughout the polymer, the hydrolysis of a polymer in latex form is conducted with lower concentrations of the hydrolysis agent (0.001 to 0.20 chemical equivalent by weight of the hydrolyzing agent for every 100 parts by weight of the polymer) at elevated temperatures of 65 to 250° C. The presence in the latex of a material having a swelling action on the polymer particles, such as residual unreacted monomers or a suitable solvent for the polymer, seems to facilitate the hydrolysis reaction and result in higher and more uniform carboxyl distribution.

For the rubber and plastic processors having no polymerization facilities the hydrolysis reaction may also be carried out by masticating the solid polymer with the hydrolysis agent on a rubber mill, in an internal mixer, Banbury mixer, etc. at elevated temperatures similar to those utilized in latex or solution hydrolysis. Again, if alkaline hydrolysis agents are utilized it is understood that the solid (saponified) polymer be malaxated with water or dilute acid in order to free the polymer of the

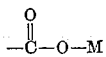

groupings, where M is an alkali metal, ammonium or other residue from the hydrolysis agent. The resultant product is a plastic polymer containing combined (or "polymer bound") carboxyl (—COOH) groups.

The hydrolysis of the acrylic polymers and particularly of the acrylic ester polymers may also be carried out during the polymerization of the original polymer. By this method, which may also be advantageously utilized by rubber and plastic processors having polymerization facilities, the hydrolysis agent is incorporated into a suitably stabilized polymerization recipe and the polymerization conducted in any conventional manner at reaction temperatures above 30° C. As in the previously described alternative procedures, if alkaline hydrolysis agents are utilized the finished latex should be acid coagulated or extracted or the coagulum malaxated in the presence of water or aqueous acid solutions to generate free carboxyl groups in the polymer.

In any of the described manners of conducting the hydrolysis there may be utilized both alkaline and acidic hydrolyzing agents. Suitable acidic hydrolyzing agents include the strong mineral acids such as hydrochloric acid, hydrobromic acid, hydriodic acid, sulfuric acid, nitric acid, phosphoric acid, and others and in addition certain strong organic acids, such as dichloracetic acid, maleic acid, oxalic acid, and others. Illustrative alkaline hydrolysis agents include the alkali hydroxides such as sodium, potassium and ammonium hydroxides, and the quaternary ammonium bases such as cetyl dimethyl ammonium hydroxide, and others; certain salts of quaternary ammonium bases such as cetyl dimethyl benzyl ammonium bromide, alkyl ($C_{12}$ to $C_{18}$) dimethyl benzyl ammonium chlorides, and others; simple primary, secondary, and tertiary amines such as ethylamine, diethylamine, diethylbenzylamine, methyldiethylamine, and others, and strong heterocyclic amines such as piperidine and others; and salts of a strong base and a weak acid such as sodium bicarbonate, sodium carbonate, sodium silicate, sodium meta-silicate, sodium oxalate, sodium lactate and others. The strongly alkaline hydrolysis agents such as the alkaline hydroxides including ammonium hydroxide and the quaternary ammonium bases are particularly preferred for hydrolysis in solution, for latex hydrolysis, and hydrolysis during polymerization, while the quaternary ammonium salts and the salts of a strong base and a weak acid such as sodium bicarbonate and the like are preferred for hydrolysis by mastication because they are solids and are, therefore, more easily incorporated into the plastic solid polymer.

The amount of hydrolyzing agent utilized in any of the above-described manners of carrying out the hydrolysis reaction will depend on the hydrolyzing agent itself, on the degree of hydrolysis desired (or rather, on the amount of carboxyl desired in the final polymer) and on the medium in which the hydrolysis is conducted. For example, among the alkaline hydrolyzing agents, sodium hydroxide, potassium hydroxide, ammonium hydroxide, and the quaternary ammonium bases are so strong in their hydrolyzing action that only small amounts need be utilized.

The acidic hydrolyzing agents generally are less active and relatively larger amounts have to be utilized. In general, at least a chemical equivalent by weight of a hydrolysis reagent for every equivalent weight of carboxyl desired in the final product should be utilized. This means, for example, that a minimum of 0.001 to 0.300 chemical equivalent by weight per 100 parts by weight of carboxyl-containing polymer or 0.04 to 12.0 parts by weight per 100 parts of polymer (phr.) of sodium hydroxide should be utilized. In solution, latex and polymerization hydrolysis where the mobility of the reactants is greatest and a more or less randomly uniform attack by the hydrolysis agent is obtained, only very small amounts need be used but in hydrolysis by mastication slightly larger amounts generally are required. It is found that, in general, from 0.01 to 5.0% by weight based on the polymer is sufficient.

However produced, the hydrolyzed acrylate polymer in order to be capable of being converted to a polymeric metallo-carboxylate by the action of a polyvalent metallic oxide should contain certain amounts of combined (—COOH) groups. The combined (—COOH) content of the hydrolyzed polymer is expressed herein as chemical equivalents by weight per 100 parts of polymer of (—COOH) (herein abbreviated ephr.). The latter value is easily determined, for example, by titration of a solution of the polymer with alcoholic KOH to a phenolphthalein end-point. The polymers of the alkyl acrylates or polymers derived from monomeric mixtures predominating in an alkyl acrylate which contain from 0.01 to 0.30 chemical equivalent of (—COOH) per 100 parts of polymer are predominantly plastic in nature and are adapted to produce, when elasticized by the action of a polyvalent metallic oxide, permanently rubbery elastic compositions. Polymers containing in excess of 0.30 ephr. of (—COOH) are more resinous in nature and are adapted to the production of very hard, rigid compositions. Polymers containing from 0.02 to 0.20 ephr. of (—COOH) are preferred for the production of elastic compositions having a good all-around balance of strength, modulus, elongation and hardness and polymers containing from 0.02 to 0.15 ephr. of (—COOH) are preferred for the production of compositions having the best low temperature flexibility.

The intermixture of the plastic, carboxyl-containing polymer with the polyvalent metal oxide is performed in any conventional manner such as by mill-mixing, mixing in a Banbury mixer or other type of internal mixer, by mixing an aqueous dispersion of the metal oxide with a latex or artificially-prepared aqueous dispersion of the carboxyl-containing polymer (in which case films and shaped articles can be prepared from the resulting mixed dispersion by the coagulant dip method) and precipitating the mixed dispersion, and the like. The intermixture of the carboxyl-containing polymer and the metal oxide should be performed at moderate working temperatures, that is, below mill roll temperatures of about 275° F. and more preferably below 200° F., in order to avoid "scorching" of the stock. The mastication of the mixture should be continued until the resulting mixture is homogeneous and the metal oxide is well dispersed in the polymer. Softeners, plasticizers, milling aids, age-resistors, carbon black, pigments and fillers, and other substances may be incorporated into the polymer, preferably before addition of the metal oxide. In any case the resulting mixture should be plastic, workable and homogeneous.

The polyvalent metal oxides useful as curing or elasticizing agents in the method of this invention include those of zinc, magnesium, cadmium, calcium, titanium, aluminum, barium, strontium, copper(ic), cobalt, tin, iron, lead and others. Specifically, zinc oxide, calcium oxide, cadmium oxide (CdO), magnesium oxide, dibutyl tin oxide [(C4H9)2SnO)], lead oxide (PbO and Pb3O4), barium oxide, cobalt oxide (Co2O3), tin oxide (SnO), strontium oxide (SrO), and others produce superior results and are preferred. In addition, various polyvalent metal hydroxides, which in reality are hydrated metal oxides and readily split off water upon being heated or upon reaction with carboxyl groups, such as calcium hydroxide, cadmium hydroxide, zinc hydroxide, barium hydroxide, aluminum hydroxide, and others, produce excellent polymeric metallo-carboxylates and also are preferred.

The amount of polyvalent metal oxide required for efficient cure or elasticization of the plastic carboxyl-containing interpolymers will vary, of course, depending on the curing agent itself, its fineness or state of subdivision and its compatibility with the polymer, and on the carboxyl (—COOH) content of the polymer. While amounts of a polyvalent metal oxide as low as 1% based on the weight of polymer will effect a detectable degree of elasticization in carboxyl-containing polymers, it has been found that an empirical relationship exists between the amount of metal oxide and the carboxyl content of the polymer. Generally the amount of polyvalent metallic oxide should be chemically equivalent to at least one fourth to one half the carboxyl content of the polymer. Much better results are obtained when a chemical equivalent amount of polyvalent metallic oxide is utilized. Since excess metal oxide functions as a filler only and the presence of excess curing agent seems to favor the formation of stronger polymeric metallo-carboxylates, it is preferred to utilize twice or more chemical equivalent amounts of the polyvalent metal oxide.

While the salt-formation reaction between the metallic cation of a polyvalent metallic oxide and a carboxyl-containing polymer is vigorous compared to, for example, sulfur vulcanization of natural and synthetic rubbers, and will occur to some extent on long standing at room temperature, it is preferred to heat the mixture of polyvalent metallic oxide and carboxyl-containing polymer to temperatures of from 125 to 400° F., preferably 150 to 350° F. At these temperatures efficient elasticization is achieved in from about 5 minutes to about two hours. Since one of the usual products of the salt-formation reaction is water, the formation of polymeric metallo-carboxylates in thick polymer cross sections is preferably effected under a pressure and at a temperature at which water will not be vaporized. For the latter reason, it is preferable to effect the cure of thicker cross sections in a mold at temperatures of 150 to 350° F. under pressures from 1,000 to 30,000 lbs./sq. in. or more.

The invention will be more fully described with reference to the following specific examples demonstrating the preparation of various polymeric metallo-carboxylates. The examples are intended to be illustrative only and not as limitations on the scope of the invention.

Example 1

A polymer of ethyl acrylate is prepared by the polymerization at 50° C. of the monomeric ethyl acrylate contained in a reaction mixture having the following composition:

| Material | Parts/Wt. |
| --- | --- |
| Ethyl Acrylate | 100.0 |
| Emulsifier #1 [1] | 8.0 |
| Emulsifier #2 [1] | 1.0 |
| K2S2O8 | 0.3 |
| Water | 200.0 |

[1] #1. Fatty acid soap flakes. #2. Sodium salt of polymerized alkyl naphthalene sulfonic acids.

The reaction is substantially complete in 16 hours with the production of a very stable polymer latex.

The above latex as obtained, containing from 5% or more of unreacted ethyl acrylate is mixed with 0.14 chemical equivalent by weight of NaOH per 100 parts of polymer, the reaction vessel closed and its contents heated under agitation for six hours at 150° C. The resultant caustic-treated polymer is then acidified with hydrochloric acid to a pH of 1.0. The latter treatment results in complete coagulation of the latex. The coagulum is then washed twice with acidified water at a temperature of 60 to 70° C., 3 times with clear water at 50 to 60° C. until acid free, and then dried in an air oven.

The resultant dry coagulum is analyzed for carboxyl content by dissolving 1 gram of the polymer in 100 ml. of a 50/50 mixture of benzene and ethanol and titrating a 10 ml. aliquot portion of the solution with standardized potassium hydroxide using phenol-phthalein as an indicator. It is found to contain 0.06 chemical equivalents (ephr.) of (—COOH) per 100 parts of polymer (theory 0.14 ephr.). The carboxyl-containing polymer is then admixed on a two-roll plastic mill with 8 parts by weight of zinc oxide per 100 parts of polymer (phr.) until a homogeneous composition is obtained. Molding of the resulting composition for 40 minutes at 270° F. produces a strong elastic polymeric metallo-carboxylate having a tensile strength of 1020 lbs./sq. in., an elongation of 700%, and a modulus at 100% elongation of 400 lbs./sq. in. When the untreated polyethylacrylate is similarly mixed with zinc oxide and similarly press-molded it exhibits no evidence of cure or elasticization.

Example 2

A portion of the polyethyl acrylate latex prepared in Example 1 is coagulated by pouring into a 1 to 2% calcium chloride solution and the resultant coagulum after drying is dissolved in a sufficient quantity of a solvent consisting of 75% by volume of benzene and 25% by volume of ethyl alcohol to make a 5% solution. To the resulting solution 0.15 chemical equivalent by weight of potassium hydroxide per 100 parts of polymer are added, the vessel closed, and its contents agitated for 5 hours at 50° C. The solution is then made acid to a pH of about 1.5 by the addition of hydrochloric acid. The polymer is then precipitated by addition of an equal volume of hexane and the precipitate freed of solvent by drying. The resultant plastic rubbery material is found to contain 0.11 ephr. of (—COOH). When the carboxyl-containing rubbery material is admixed with 8.0 phr. of zinc oxide and press-molded 60 minutes at 270° F., an elastic polymeric metallo-carboxylate is obtained which is possessed of a tensile strength of 3100 lbs./sq. in. and an elongation of 300%. By comparison, when the untreated polyethyl acrylate is admixed with zinc oxide, litharge, sodium meta silicate or sodium hydroxide the tensile strength of the cured compositions generally does not exceed 1,000 lbs./sq. in.

*Example 3*

In a manner similar to that of Example 1, separate portions of a latex of polyethylacrylate polymer similar to that of Example 1 are treated with, respectively, 0.518 ephr. of NaOH to yield a polymer containing 0.19 ephr. of (—COOH) and with 0.908 ephr. of NaOH to yield a polymer containing 0.39 ephr. of (—COOH). The former hydrolyzed polymer when mixed with 8.0 phr. of zinc oxide and cured 60 minutes at 270° F. yields a strong, very elastic and clear composition of excellent properties. The latter hydrolyzed polymer (containing 0.39 ephr. —COOH) when mixed with 18.3 phr. of zinc oxide and cured 60 minutes at 270° F. yields a very hard, stiff polymeric metallo-carboxylate useful as a rigid plate or extruded rod etc.

*Example 4*

Ethyl acrylate is polymerized in a medium having the following composition:

| Material | Parts/Wt. |
| --- | --- |
| Ethyl Acrylate | 100.0 |
| Water | 200.0 |
| Emulsifier [1] | 2.0 |
| $K_2S_2O_8$ | 0.005 |
| Hydrolyzing agent—Variable | |

[1] A sodium salt of n-octadecyl-N-1,2-dicarboxyethyl sulfosuccinamate known as "Aerosol #22."

The polymerization is carried out under reflux at atmospheric pressure. When 0.1 part per 100 parts of monomers of reagent grade of KOH is added to the polymerization medium as the hydrolyzing agent the polymerization proceeds to substantial completion in about two hours. The resulting aqueous dispersion of polymer is then made acid to a pH of about 1.0 to 1.5 by the addition of hydrochloric acid. The acidification results in complete coagulation of the dispersion. The coagulum is washed with three acid washes at 60 to 70° C., two clear water washes at 50 to 60° C., and then dried in an air oven. The resulting coagulum is then mixed with 15.0 phr. of zinc oxide and molded for 40 minutes at 260° F. to yield a very strong, but pliable polymeric metallo-carboxylate having a tensile strength in excess of 3,000 lbs./sq. in.

*Example 5*

A polyethylacrylate similar to that prepared in Example 1 is placed upon a two roll mill, the rolls of which are maintained at 120° F. or lower, and masticated until a smooth sheet is formed. To the smooth sheet there is added 0.1 part per 100 parts of polymer of an alkyl ($C_{12}$ to $C_{18}$) dimethyl benzyl ammonium chloride and the milling continued for a total of 15 minutes. The resulting composition is cut from the rolls and subjected to further mastication in an internal mixer in the presence of a liberal quantity of hydrochloric acid solution. The mass is then removed from the mixer, sheeted out on a two roll wash mill under a clear water wash, and dried in a circulating air oven. When compounded with 20 phr. of zinc oxide and heated in a press mold for 40 minutes at 260° F. a very strong elastic polymeric metallo-carboxylate is obtained.

*Example 6*

When the hydrolyzed polymer compositions of the foregoing examples are admixed with amounts of other polyvalent metallic oxides chemically equivalent to the amounts of zinc oxide therein utilized, polymeric metallo-carboxylates are obtained having equivalent or superior properties to that obtained with zinc oxide. For example, magnesium oxide, calcium oxide, cadmium oxide, aluminum oxide, titanium oxide, barium oxide, strontium oxide (SrO), cupric oxide, cobalt oxide ($Co_2O_3$), tin oxide (SnO), litharge (PbO), cadmium hydroxide, barium hydroxide, calcium hydroxide, zinc hydroxide, and dibutyl tin oxide [$(C_4H_9)_2SnO$] produce particularly useful compositions having high strength and other excellent properties.

*Example 7*

The substitution in the previous examples of polymethylacrylates, polypropyl acrylate, poly-n-butyl acrylate and others for polyethylacrylate produces cured or elasticized compositions varying in hardness. For example, polymethylacrylate produces, by the method of this invention, polymeric metallo-carboxylates which are slightly harder, tougher and of higher strength than those obtained from polyethylacrylate while those obtained from, for example, poly-n-butyl acrylate are softer. Polymeric metallo-carboxylates obtained by the method of this invention from the higher acrylates such as 2-ethylhexyl acrylate are very soft and are adaptable to use in curable adhesive layers and the like.

The polymeric metallo-carboxylates produced by the method of this invention in addition to their excellent elasticity and high strength possess the desirable properties possessed by polyacrylates cured by known methods. Thus they possess great resistance to sunlight, ozone, heat, abrasion, and other deleterious influences, and excellent electrical properties. The polymeric metallo-carboxylates of this invention are useful for the preparation of clear and translucent unsupported films of high strength, coated and calendered fabrics such as upholstery fabrics, electrical insulation, the preparation of aqueous coating compositions and lacquers, cements, etc. and other uses.

While I have disclosed certain illustrative manners of practicing my invention, it is to be understood that the invention is not limited thereto and that numerous variations and modifications which will be obvious to those skilled in the art are within the spirit and scope of the invention as defined by the appended claims.

I claim:

1. The method which comprises preparing a mixture of (1) a plastic polymer derived from a monomeric mixture comprising a major proportion of an alkyl ester of acrylic acid containing from 1 to 12 carbon atoms in the alkyl group reacted first with an alkaline hydrolyzing agent and then with a strong acid so as to introduce into said polymeric acrylic ester from 0.01 to 0.30 chemical equivalent by weight of combined (—COOH) per 100 parts by weight of polymer, and (2) an amount of a polyvalent metal oxide at least equivalent chemically to one-half said polymeric combined (—COOH), and heating the resultant plastic composition at a temperature of from 125 to 400° F. until said plastic composition has been converted to an essentially elastic polymeric metallo-carboxylate.

2. The method which comprises preparing a mixture of (1) a plastic polymer of an alkyl acrylate in which the alkyl group contains from 1 to 4 carbon atoms reacted first with an alkaline hydrolyzing agent and then with a strong acid so as to introduce into said polymeric alkyl acrylate from 0.01 to 0.30 chemical equivalent of combined (—COOH) per 100 parts by weight of polymeric ester, and (2) an amount of a polyvalent metallic oxide at least equivalent chemically to said polymeric combined (—COOH), and heating the resultant plastic composition at a temperature of from 125 to 350° F. until said plastic composition has been converted to an essentially elastic polymeric metallo-carboxylate.

3. The method which comprises preparing a mixture of (1) a polymer prepared by treating a latex of a plastic polymer of an alkyl ester of acrylic acid in which the alkyl group contains from 1 to 4 carbon atoms first with an alkaline hydrolyzing agent at a temperature of from 30 to 250° C. and then with a strong acid so as to introduce into said polymer from 0.01 to 0.30 chemical equivalent by weight of combined (—COOH) per 100 parts by weight of polymer, and (2) an amount of a polyvalent metal oxide at least equivalent chemically to said polymeric combined (—COOH), and heating the resultant plastic composition at a temperature of from 125 to 400° F. until said plastic composition has been converted to an essentially elastic polymeric metallo-carboxylate.

4. The method which comprises preparing a mixture of (1) a polymer prepared by masticating a plastic polymer of an alkyl acrylate in which the alkyl group contains 1 to 4 carbon atoms first with an alkaline hydrolyzing agent and then with a strong acid until a smooth homogeneous composition is obtained containing from 0.01 to 0.30 chemical equivalent by weight of combined (—COOH) per 100 parts by weight of polymeric alkyl acrylate, and (2) an amount of a polyvalent metal oxide at least equivalent chemically to said combined (—COOH), and heating the resultant plastic composition at a temperature of from 125 to 400° F. until said plastic composition has been converted to an essentially elastic polymeric metallo-carboxylate.

5. The method which comprises preparing a mixture of (1) a polymer prepared by dissolving a plastic polymer of an alkyl acrylate in a solvent therefor, adding an alkaline hydrolyzing agent to the resulting solution, heating the resultant mixture at temperatures of from 30 to 250° C., and then adding a strong acid thereto so as to introduce into said polymeric alkyl acrylate from 0.01 to 0.30 chemical equivalent by weight of combined (—COOH) per 100 parts by weight of polymer, and (2) an amount of a polyvalent metal oxide at least equivalent chemically to said combined (—COOH), and heating the resultant plastic composition at a temperature of from 125 to 400° F. until said plastic composition has been converted to an essentially elastic polymeric metallo-carboxylate.

6. The method which comprises preparing a mixture of (1) a polymer prepared by reacting a latex of a plastic ethyl acrylate polymer first with an alkaline hydrolyzing agent and then with a strong acid at temperatures of from 30 to 250° C. so as to introduce into said polymer from 0.01 to 0.30 chemical equivalent by weight of combined (—COOH) per 100 parts by weight of polymer, and (2) an amount of a polyvalent metal oxide at least equivalent to twice said polymeric combined (—COOH), and heating the resultant plastic composition at a temperature of from 150 to 350° F. until said plastic composition has been converted to an essentially elastic polymeric metallo-carboxylate.

7. The method which comprises preparing a mixture of (1) a polymer prepared by masticating a solid plastic polymer of ethyl acrylate first with an alkaline hydrolyzing agent and then with a strong acid so as to obtain a homogeneous plastic composition containing from 0.01 to 0.30 chemical equivalent by weight of combined (—COOH) per 100 parts of polymer, and (2) an amount of a polyvalent metal oxide at least equivalent chemically to twice said polymeric combined (—COOH), and heating the resultant plastic composition at a temperature of from 150 to 350° F. until said plastic composition has been converted to an essentially elastic polymeric metallo-carboxylate.

8. The method which comprises preparing a mixture of (1) a polymer prepared by dissolving a plastic polymer of ethyl acrylate in a solvent therefor, adding an alkaline hydrolyzing agent to the resultant solution, agitating at a temperature of from 30 to 250° C. and subsequently adding a strong acid thereto so as to introduce into said polymer from 0.01 to 0.30 chemical equivalent of combined (—COOH) per 100 parts by weight of polymeric ethyl acrylate, and (2) an amount of a polyvalent metallic oxide at least equivalent chemically to twice said polymeric combined (—COOH), and heating the resulant plastic composition at a temperature of from 125 to 350° F. until said plastic composition has been converted to an essentially elastic condition.

9. The method of claim 6, in which the ethyl acrylate polymer is polyethylacrylate and the polyvalent metal oxide is zinc oxide.

10. The method of claim 7, in which the ethyl acrylate polymer is polyethylacrylate and the polyvalent metal oxide is zinc oxide.

11. The method of claim 8, in which the ethyl acrylate polymer is polyethylacrylate and the polyvalent metal oxide is zinc oxide.

HAROLD P. BROWN.

References Cited in the file of this patent

UNITED STATES PATENTS

| Number | Name | Date |
|---|---|---|
| 2,398,350 | Atwood | Apr. 16, 1946 |
| 2,416,060 | McAlevy et al. | Feb. 18, 1947 |
| 2,504,049 | Richards | Apr. 11, 1950 |
| 2,581,832 | Blume | Jan. 8, 1952 |